US006846079B2

(12) United States Patent
Ogawa et al.

(10) Patent No.: US 6,846,079 B2
(45) Date of Patent: Jan. 25, 2005

(54) POLARIZATION CONVERTER, ILLUMINATION OPTICAL DEVICE HAVING THE POLARIZATION CONVERTER AND PROJECTOR

(75) Inventors: Yasunori Ogawa, Suwa (JP); Fumie Kawai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/397,430

(22) Filed: Mar. 27, 2003

(65) Prior Publication Data

US 2003/0197934 A1 Oct. 23, 2003

(30) Foreign Application Priority Data

Mar. 28, 2002 (JP) ........................................ 2002-092796

(51) Int. Cl.[7] ........................ G03B 21/26; G02F 1/1335
(52) U.S. Cl. ........................................ 353/20; 359/500
(58) Field of Search ................... 353/20, 119; 359/487, 359/500; 349/9

(56) References Cited

U.S. PATENT DOCUMENTS 6,199,987 B1 * 3/2001 Haba et al. ................... 353/34
6,460,998 B1 * 10/2002 Watanabe .................... 353/20
6,523,958 B2 * 2/2003 Takezawa et al. ............ 353/20

* cited by examiner

Primary Examiner—William C. Dowling
(74) Attorney, Agent, or Firm—Oliff & Berridge, PLC

(57) ABSTRACT

A polarization converter (414) has polarizing conversion element body (414B) including: a polarization separating film (511) that separates an incident light into two linearly polarization beam; a reflecting film (512) alternately disposed between the polarization separating films (511), the reflecting film reflecting a linearly polarization beam reflected by the polarization separating film (511); a sheet glass (513) provided with the polarization separating film (511) and the reflecting film (512); and a retardation plate (600) that converts a polarization axis of the linearly polarization beam transmitted through the polarization separating film (511), a fixing frame (414A) that shields incident light beam on a position on the light-incident side of the polarizing conversion element body (414B) not opposing to the polarizing conversion element body (414B), the fixing frame (414A) having a holder that holds an end of the polarizing conversion element body (414B) and a fixing portion to be fixed to an inner case.

12 Claims, 17 Drawing Sheets

POLARIZATION CONVERTER, ILLUMINATION OPTICAL DEVICE HAVING THE POLARIZATION CONVERTER AND PROJECTOR

BACKGROUND OF THE INVENTION

1. Field of the Invention

The present invention relates to a polarization converter, an illumination optical device having the polarization converter and a projector.

2. Description of Related Art

Conventionally, a projector has often been used for presentation at a conference, academic society and exhibition. Such projector has a plurality of optical components in a casing, where a light beam irradiated by a light source is enlarged and projected after being modulated to form a projection image. A polarization converter for converting the light beam irradiated by the light source into uniform linearly polarization beam is used for enhancing utilization efficiency of the light beam to obtain a bright projection image.

The polarization converter has a polarizing conversion element having a polarization separating film inclined relative to incident light beam to transmit and reflect the light beam from a light source to separate into two linearly polarization beams, a reflecting film for reflecting the linearly polarization beam reflected by the polarization separating film, a light-transmissive member interposed between the polarization separating film and the reflecting film so that a plurality of the polarization separating films and the reflecting films are alternately arranged, a retardation plate adhered on light-irradiation side of the polarizing conversion element to convert a polarization axis of the light beam irradiated by the reflecting film, and a light-shielding mask provided on the light-incident side of the polarizing conversion element to shield the light beam from entering onto the reflecting film.

Such polarization converter is constructed as a unit having a polarizing conversion element body including the retardation plate and the polarizing conversion element, the light-shielding mask, and a holding frame for holding and housing the polarizing conversion element body and the light-shielding mask, the unit being housed in the optical parts housing.

According to the above arrangement, however, relative position between the polarizing conversion element body and the light-shielding mask has to be adjusted as well as the position between the holding frame and the optical parts housing, thus complicating the attachment process in the optical parts housing. Though it is possible to magnify the aperture ratio of the light-shielding mask for facilitating attachment process, the light-shielding function of the mask is deteriorated.

SUMMARY OF THE INVENTION

An object of the present invention is to provide a polarization converter cable of facilitating adjustment of the relative position between the light-shielding member and the polarizing conversion element body in the optical parts housing, an illumination optical device having the polarization converter and a projector.

A polarization converter according to an aspect of the present invention has: a polarizing conversion element body including a plurality of polarization separating films inclined relative to incident light beam that separate the incident light beam into two linearly polarization beams, a plurality of reflecting films that reflect one of the linearly polarization beams separated by the polarization separating film, a light-transmissive member provided with the polarization separating film and the reflecting film, and a plurality of retardation plates provided on a light-irradiation side of the light-transmissive member to convert the polarization axis of the other linearly polarization beam; and a light-shielding member provided on the light-incident side of the light-transmissive member at a position not to oppose the retardation plate, the light-shielding member shielding the incident light beam irradiated by the light source from entering on the polarizing conversion element body, the light-shielding member having a holder that holds an end of the polarizing conversion element body and a fixing portion for the polarization converter to be attached on an optical parts housing that houses the polarization converter.

According to the above aspect of the present invention, the outer profiles of the polarizing conversion element body and the light shied are adjusted so that a light-shielding mask is located corresponding to the respective components of the polarizing conversion element body and the polarizing conversion element body is held by the holder of the light-shielding member through an adhesive to construct the polarization converter, the polarization converter being attached to the optical parts housing through the fixing portion.

Accordingly, since the polarizing conversion element body is held by the holder of the light-shielding member, which is housed in the optical parts housing, the number of the parts of the polarization converter can be reduced as compared to the conventional arrangement, and the position of the light-shielding mask relative to a predetermined position can be adjusted with high accuracy. Since the position can be adjusted with high accuracy, unnecessary light can be well shielded, thereby further efficiently utilizing the light beam from the light source.

In the above polarization on converter, the fixing portion may preferably have an extension stretching from both peripheral ends of the holder contacting the optical parts housing toward outside along a contact surface of the holder, the extension having an insert opening to be inserted to a projection formed on the optical parts housing.

The above polarization converter may be arranged, for instance, as follows.

A holding frame as a frame-shaped holder for holding the plate-shaped polarizing conversion element body is formed on the light-shielding member, and an extension stretching from the lower end of the holding frame toward outside along the surface of the holding frame is formed, the extension having a circular opening thereon. On the other hand, a projection to be inserted to the circular opening is formed on the lower side of the optical parts housing. The circular opening is inserted to the projection to attach the polarization converter to the optical parts housing. The polarization converter can be constructed with relatively simple arrangement, so that production cost of the polarization converter is not so much increased.

The light-shielding member may preferably be made of metal.

Since the light-shielding member is made of metal, sufficient rigidity as a component for holding the polarizing conversion element body can be obtained. Further, since metal has high heat conductivity, the heat generated by the polarizing conversion element body can be radiated to the outside, thereby preventing heat damage of the polarizing conversion element body which is weak against heat.

In the above polarization converter, the polarization separating film and the reflecting film may preferably be inclined approximately at forty-five degrees relative to a light-incident direction, the polarization separating film and the reflecting film alternately arranged at a predetermined interval.

According to the above arrangement, since the polarization separating film and the reflecting film are inclined approximately at forty-five degrees and are alternately arranged at a predetermined interval, the polarizing conversion element body can be manufactured without so much enlarging ineffective area generating linearly polarization beam having polarization axis different from necessary linearly polarization beam.

An illumination optical device according to another aspect of the present invention has a light source, a light splitting optical element for splitting the light beam from the light source into a plurality of sub-beams and the above polarization converter.

According to the above aspect of the present invention, the same advantages as the above polarization converter can be obtained, so that the light beam irradiated by the illumination optical device can be converted into approximately uniform linearly polarization beam, thus effectively utilizing the light beam.

A projector according to still another aspect of the present invention has the above illumination optical device, an optical modulator for modulating the light beam irradiated by the illumination optical device in accordance with image information, and a projection optical device for enlarging and projecting the light beam modulated by the optical modulator.

According to the above aspect of the present invention, the same advantages as the above illumination optical device can be obtained, so that the light beam can be effectively utilized, thus enhancing vividness of the image projected by the projector. Further, as described above, since the light beam is effectively utilized, the unnecessary light is less likely to be absorbed by the incident-side polarization plate located on the incident-side of the optical modulator, thus preventing heat damage of the polarization plate caused by absorbing the unnecessary light.

DETAILED DESCRIPTION OF PREFERRED EMBODIMENT(S)

An embodiment of the present invention will be descried below with reference to attached drawings.

1. Primary Arrangement of Projector

Figure 1:
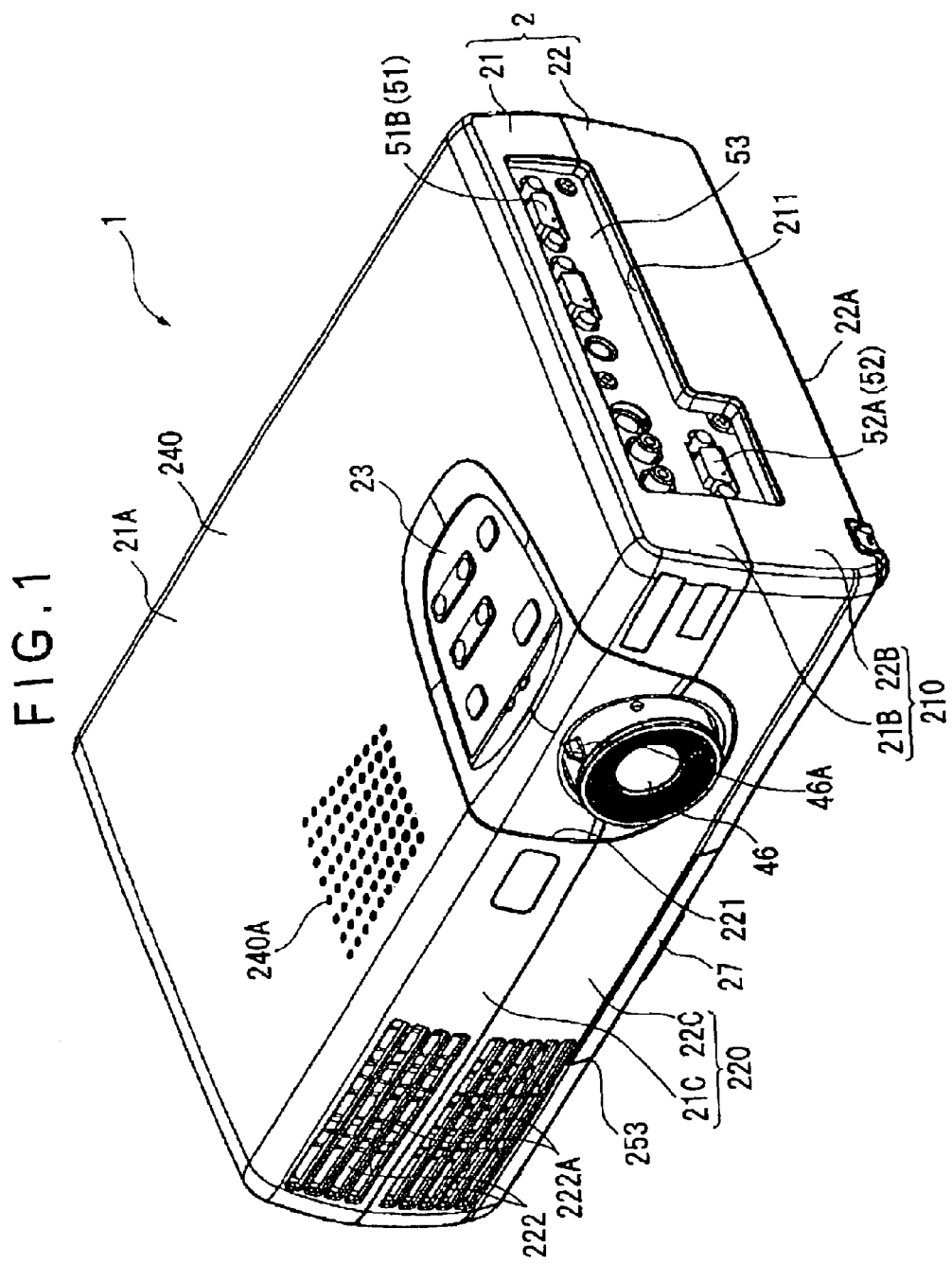
FIG. 1 is an entire perspective view showing a projector seen from upper front side thereof according to an embodiment of the present invention.
Figure 2:
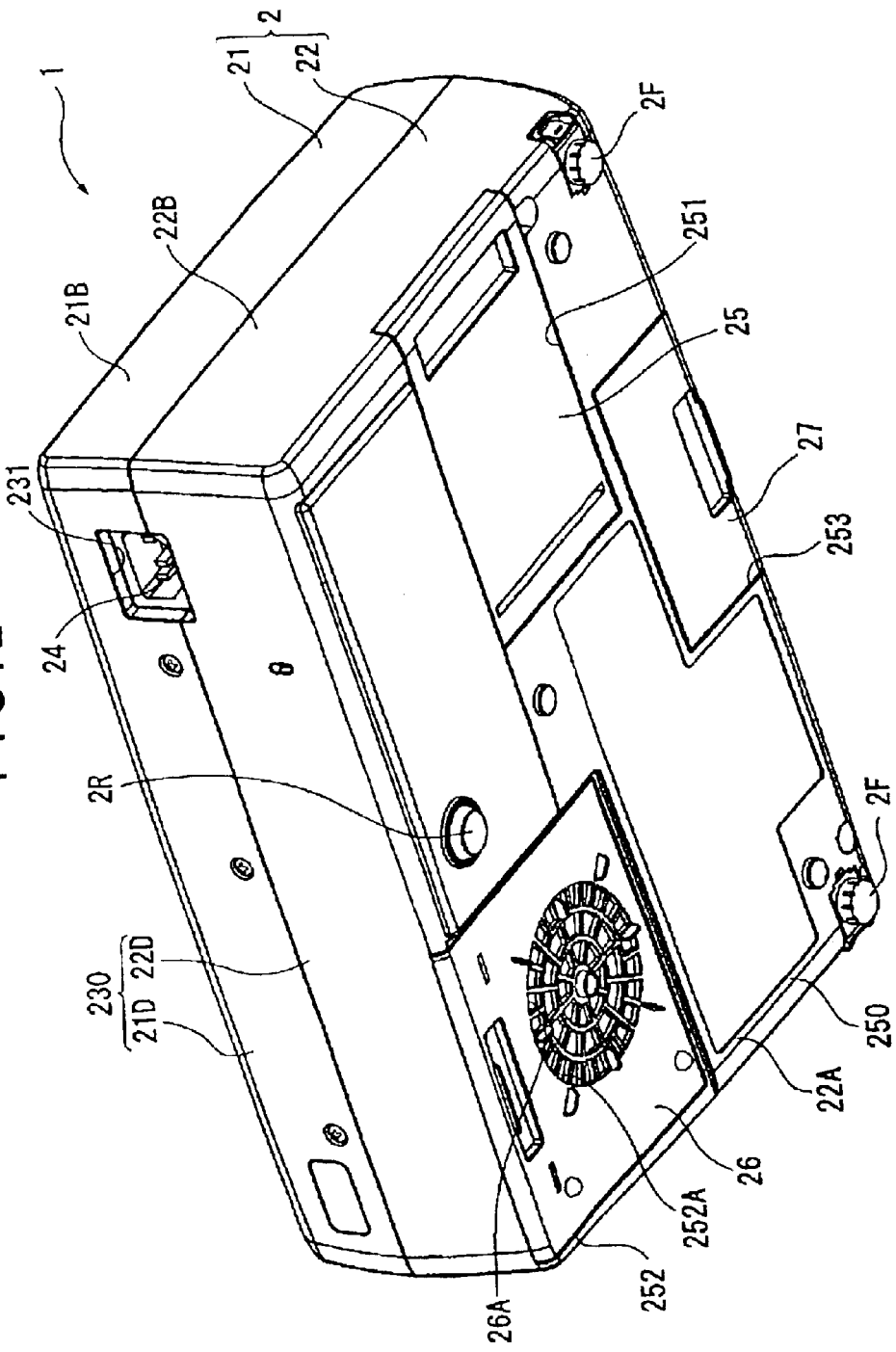
FIG. 2 is an entire perspective view showing the projector seen from lower rear side.

FIG. 1 is a perspective view of a projector 1 seen from upper front side according to an aspect of the present invention. FIG. 2 is a perspective view of the projector 1 seen from lower rear side.

As shown in FIGS. 1 and 2, the projector 1 has an approximately rectangular parallelepiped exterior case 2 made by injection molding. The exterior case 2 is a casing for housing a body of the projector 1, which includes an upper case 21 and a lower case 22, the cases 21 and 22 being attachable and detachable.

As shown in FIGS. 1 and 2, the upper case 21 includes an upper portion 21A, a lateral portion 21B, a front portion 21C and a rear portion 21D respectively constituting the upper side, lateral side, front side and rear side of the projector 1.

In the same manner, the lower case 22 includes a lower portion 22A, a lateral portion 22B, a front portion 22C and a rear portion 22D respectively constituting the lower side, lateral side, front side and rear side of the projector 1.

Accordingly, as shown in FIGS. 1 and 2, the lateral sides 21B and 22B of the upper case 21 and the lower case 22 are continuously connected to form a lateral side 210 of the rectangular parallelepiped exterior case 2. Similarly, the front portions 21C and 22C are connected to form a front side 220, the rear portions 21D and 22D are connected to form a rear side 230, the upper portion 21A forms an upper side 240 and the lower portion 22A forms a lower side 250.

As shown in FIG. 1, an operation panel 23 is provided on the front side of the upper side 240, and a sound-outputting speaker hole 240A is formed around the operation panel 23.

An opening 211 spanning over the two lateral portions 21B and 22B is formed on the lateral side 210 on the right side seen from front side. A below-described main board 51 and an interface board 52 are provided in the exterior case 2 and a connector 51B installed on the main board 51 and a connector 52A installed on the interface board 52 are exposed to the outside through an interface panel attached to the opening 211. Exterior electronics etc. are connected to the projector through the connectors 51B and 52A.

A circular opening 221 spanning between two front portions 21C and 22C is formed around the operation panel on the right side seen from the front side 220. A projection lens 46 is disposed inside the exterior case 2 corresponding to the opening 221. At this time, a distal end of the projection lens 46 is exposed to the outside from the opening 221 and the focusing operation of the projection lens 46 can be manually conducted through a lever 46A as a part of the exposed portion.

An exhaust hole 222 is formed on the front side 220 opposite to the opening 221. A safety cover 222A is formed on the exhaust hole 222.

As shown in FIG. 2, a rectangular opening 231 is formed on the right side of the rear side 230 seen from rear side. An inlet connector 24 is exposed from the opening 231.

A rectangular opening 251 is formed at the center of the right end of the lower side 250 seen from bottom side. A lamp cover 25 covering the opening 251 is detachably attached to the opening 251. A non-illustrated light source lamp can be easily exchanged by detaching the lamp cover 25.

A rectangular surface 252 dented inward is formed on the left rear corner of the lower side 250 seen from bottom side. An intake 252A for drawing in cooling air from the outside is formed on the rectangular surface 252. An intake cover 26 covering the rectangular surface is detachably provided on the rectangular surface 252. An opening 26A corresponding to the intake 252A is formed on the intake cover 26. A non-illustrated air filter is provided on the opening 26A to prevent invasion of dust into the interior of the casing.

A rear leg 2R constituting one of the legs of the projector 1 is formed approximately at the center on the rear side of the lower side 250. Further, front legs 2F also constituting the legs of the projector 1 are respectively provided on the right and left corners on the front side of the lower side 250. In other words, the projector 1 is supported on three points by the rear leg 2R and the two front legs 2F.

The two front legs 2F is vertically advanceable and retractable, so that the inclination (attitude) of the projector 1 in front and back direction and right and left direction can be adjusted to adjust the position of the projection image.

Further, as shown in FIGS. 1 and 2, a rectangular parallelepiped recess 253 is formed approximately at the center of the front side of the exterior case 2 spanning over the lower side 250 and the front side 220. A cover 27 covering the lower side and front side of the recess 253 and slidable in front and back direction is provided on the recess 253. A non-illustrated remote controller for remotely controlling the projector 1 is housed in the recess 253 covered by the cover 27.

Figure 3:
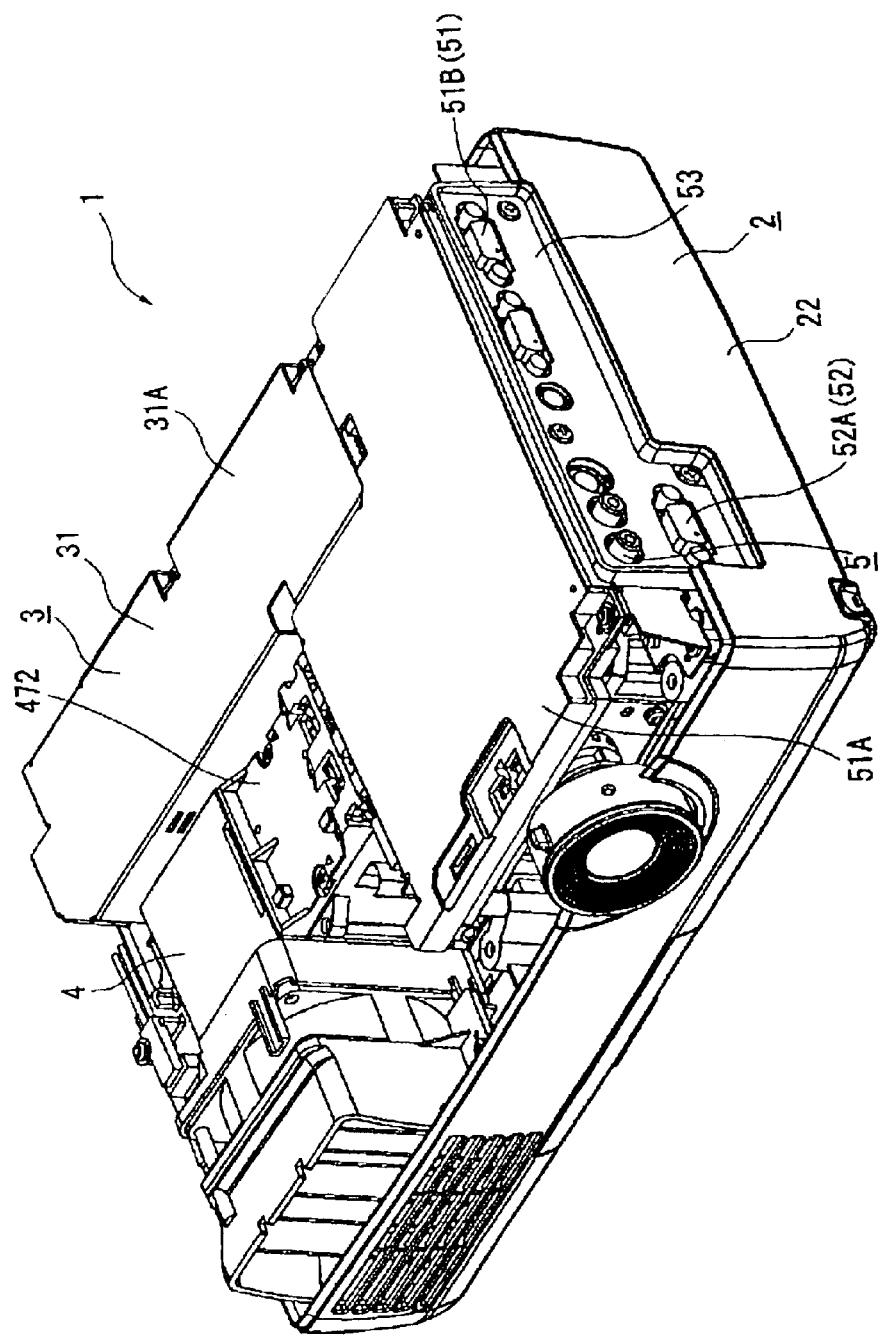
FIG. 3 is a perspective view showing the interior of the projector, which specifically shows a condition where an upper case of the projector is removed from FIG. 1.
Figure 4:
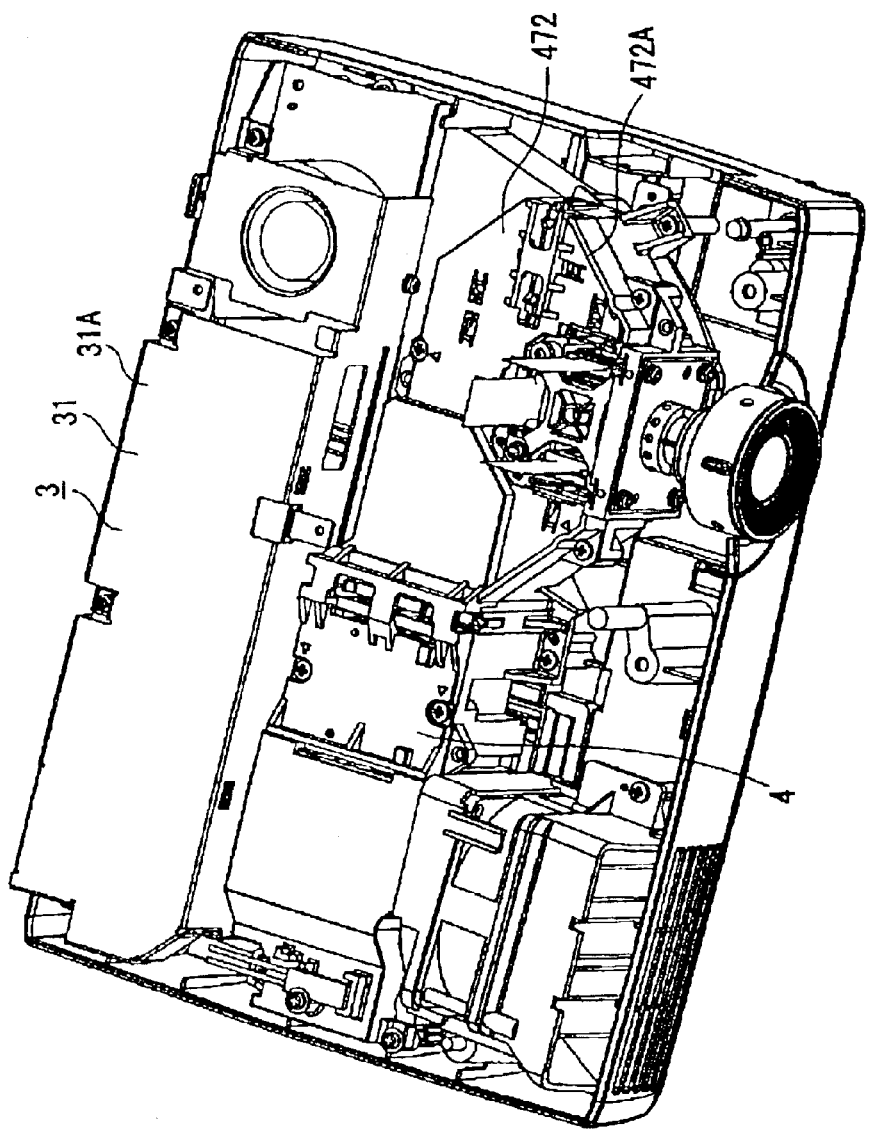
FIG. 4 is a perspective view showing the interior of the projector, which specifically shows a condition where a control board is removed from FIG. 3.

FIGS. 3 and 4 are perspective view showing the interior of the projector 1. Specifically, FIG. 3 is an illustration showing the upper case 21 being removed from FIG. 1. FIG. 4 is an illustration with a control board 5 being removed from FIG. 3.

As shown in FIGS. 3 and 4, the exterior case has a power source unit 3 disposed along the rear side and extending in right and left direction, an optical unit 4 disposed on the front side of the power source unit 3 as a planarly-viewed L-shaped optical system and the control board 5 as a controller disposed on the upper right side of the units 3 and 4. The components 3 to 5 constitute the primary portion of the projector 1.

The power source unit 3 has a power source 31 and a non-illustrated lamp driving circuit (ballast) disposed below the power source 31.

The power source 31 supplies the electric power from the outside to the lamp driving circuit, the circuit board 5 etc. through a non-illustrated power cable connected to the inlet connector.

The lamp driving circuit supplies electric power fed by the power source 31 to a light source lamp (not shown in FIGS. 3 and 4) of the optical unit 4, which is electrically connected to the light source lamp. The lamp driving circuit is, for instance, constructed by wiring on a board.

The power source 31 and the lamp driving circuit are vertically arranged approximately in parallel, which occupy the space extending in right and left direction on the rear side of the projector 1.

The surroundings of the power source 31 and the lamp driving circuit are covered with a metal shield 31A such as aluminum with right and left sides thereof being opened.

The shield 31A works as a duct for guiding the cooling air and prevents leakage of the electromagnetic noise generated by the power source 31 and the lamp driving circuit toward the outside.

As shown in FIG. 3, the control board 5 is disposed to cover the upper side of the units 3 and 4, which includes the main board 51 including a CPU and the connector 51B and the interface board 52 disposed below the main board 51 and including the connector 52A.

In the control board 5, the CPU on the main board 51 controls a liquid crystal panel of the below-described optical device in accordance with the image information inputted through the connectors 51B and 52A.

The surroundings of the main board 51 is covered with a metal shield 51A. Though not clearly shown in FIG. 3, the main board 51 abuts to an upper end 472A of an upper inner case 472 of the optical unit 4.

2. Detailed Construction of Optical Unit

Figure 5:
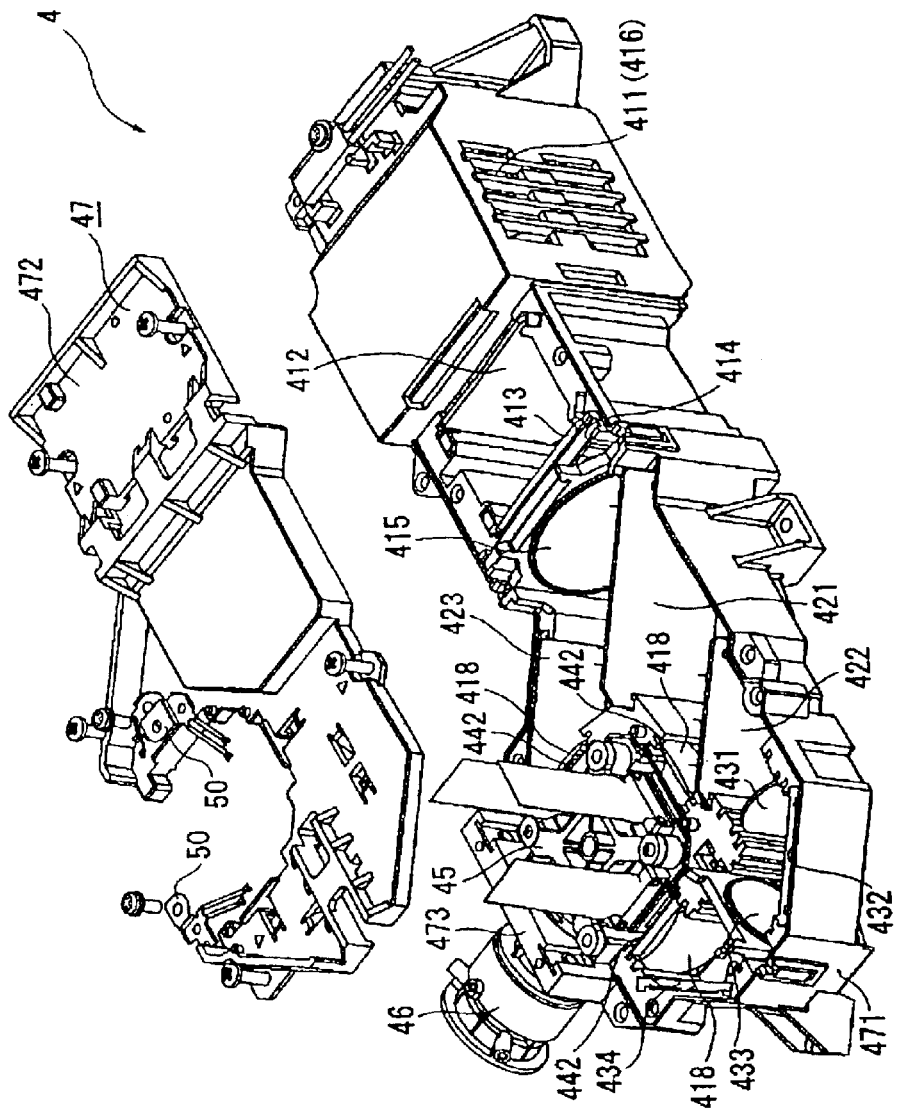
FIG. 5 is an exploded perspective view showing an optical unit.
Figure 6:
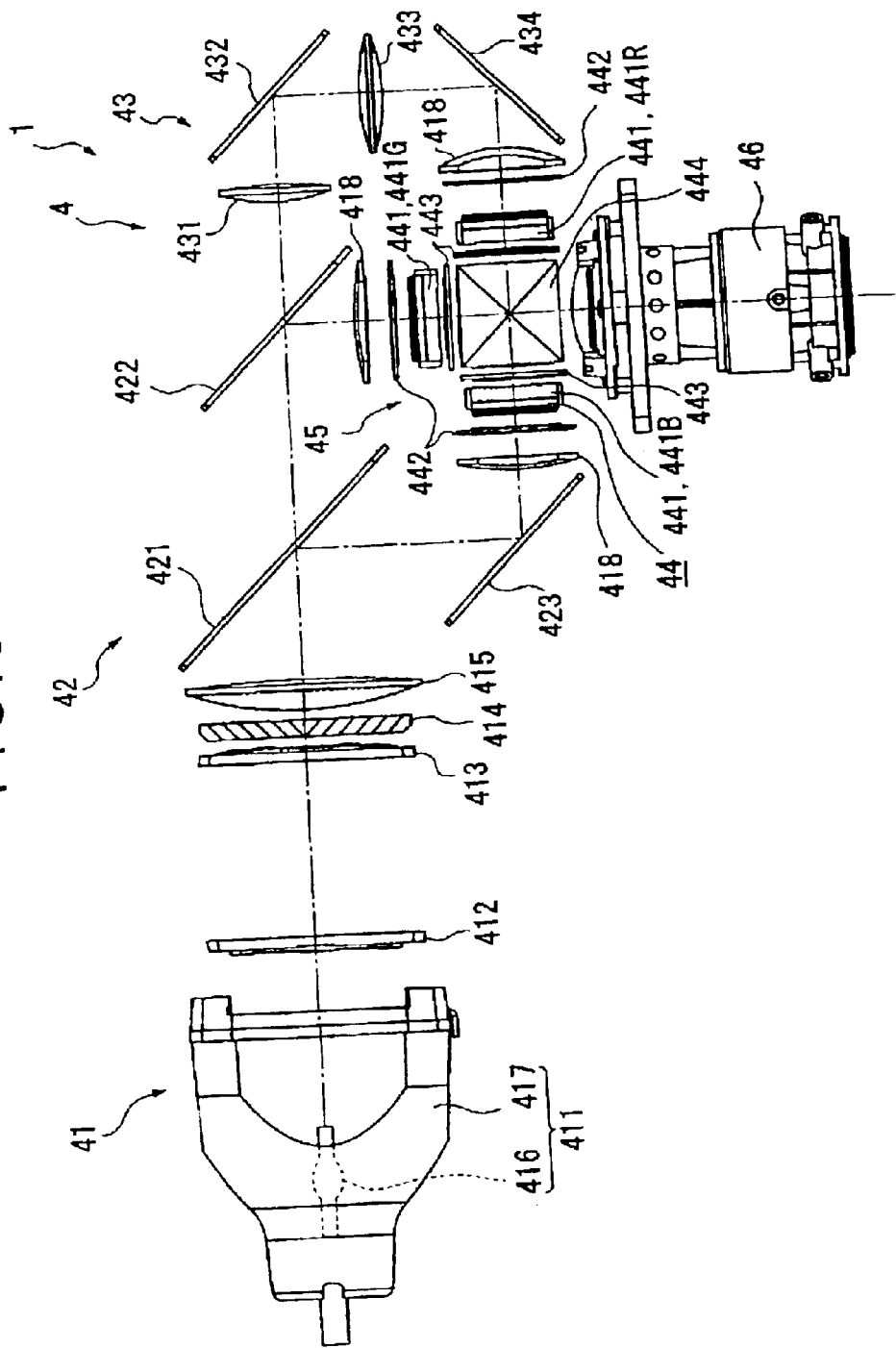
FIG. 6 is a schematic illustration of the optical unit.

FIG. 5 is an exploded perspective view showing the optical unit 4. FIG. 6 is a schematic illustration of the optical unit 4.

As shown in FIG. 6, the optical unit 4 is a unit for optically process the light beam irradiated by a light source lamp 416 of a light source 411 to form an optical image corresponding to the image information and project the optical image in an enlarged manner, which includes an integrator illuminating optical system 41, a color separating optical system 42, a relay optical system 43, an optical device 44, the projection lens 46 as a projection optical system, and an inner case 47 made of synthetic resin for housing the optical components 41 to 44 and 46 (FIG. 5).

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes the light source 411, a first lens array 412, a second lens array 413, a polarization converter 414 and a superposing lens 415.

The light source 411 has the light source lamp 416 as a radiation light source and a reflector 417, which changes the radial light beam irradiated by the light source lamp 416 into a parallel light beam by the reflector 417 to emit the parallel light beam toward the outside. A high-pressure mercury lamp is used as the light source lamp 416. Incidentally, metal halide lamp and a halogen lamp etc. may be used instead of the high-pressure mercury lamp. A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415. The polarization converter 414 converts the light from the second lens array 413 to uniform polarized light in order to enhance light utilization efficiency in the optical device 44.

Specifically, the respective sub-beams converted into single polarize light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44. Incidentally, detailed structure of the polarization converter 414 will be described below.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection minors 432 and 434, and introduces the red color light separated by the color separating optical system 42 onto the liquid crystal panel 441R.

At this time, the red light component and the green light component of the light beam irradiated from the integrator illuminating optical system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441R function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Incidentally, though the red light passes through the relay optical system 43, blue light may pass through the relay optical system 43 instead of red light.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarizing plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc. Incidentally, polarization film may be formed on the field lens 418 without employing the substrate.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam. Incidentally, polarization film may be formed on the cross dichroic prism 444 without employing substrate.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

Figure 7:
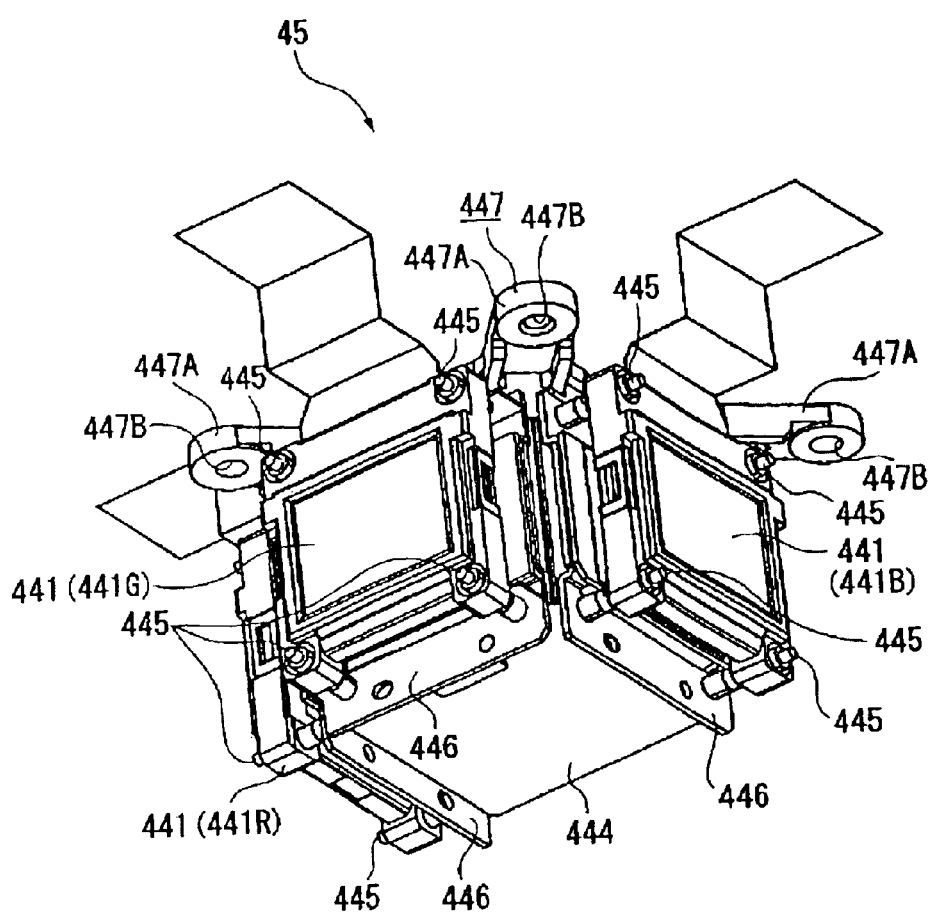
FIG. 7 is a perspective view showing an optical device body from lower side.

The above-described liquid crystal panels 441, the irradiation-side polarization plate 443 and the cross dichroic prism 444 are constructed as an integrated unit of optical device body 45. FIG. 7 is a perspective view showing the optical device body 45.

As shown in FIG. 7, the optical device body 45 has the cross dichroic prism 444, a fixing plate 447 made of synthetic resin and fixed on the upper side of the cross dichroic prism 444, a metal holding plate 446 attached to the light-incident side of the cross dichroic prism 444 for holding the irradiation-side polarization plate 443, and the liquid crystal panels 441 (441R, 441G and 441G) held by four pins 445 made of transparent resin attached to the light-incident side of the holding plate 446.

A predetermined gap is secured between the holding plate 446 and the liquid crystal panel 441, so that the cooling air can flow through the gap.

The optical device body 45 is screwed to the lower inner case 471 through a circular hole 447B of four arms 447A formed on the fixing plate 447.

The projection lens 46 enlarges and projects the color image combined by the cross dichroic prism 444 of the optical device 44.

As shown in FIG. 5, the inner case 47 has the lower inner case 471 having a groove on which the optical components 412 to 415, 418, 421 to 423, 431 to 434 and 442 are slidably fitted from the above, and a lid-shaped upper inner case 472 for closing the upper opening of the lower inner case 471.

As shown in FIG. 5, the light source 411 is housed on a side of the lower inner case 471 of approximately planarly-viewed L-shape. The projection lens 46 is screwed to the other end of the lower inner case 471 through a head component formed on the lower inner case 471.

As shown in FIG. 5, the optical device body 45 housed in the lower inner case 471 is screwed to the lower inner case 471 with two springs 50 being sandwiched. The two springs 50 bias the field lens 418 and the incident-side polarization plate 442 toward lower side to fix the position thereof.

3. Cooling Mechanism

Figure 8:
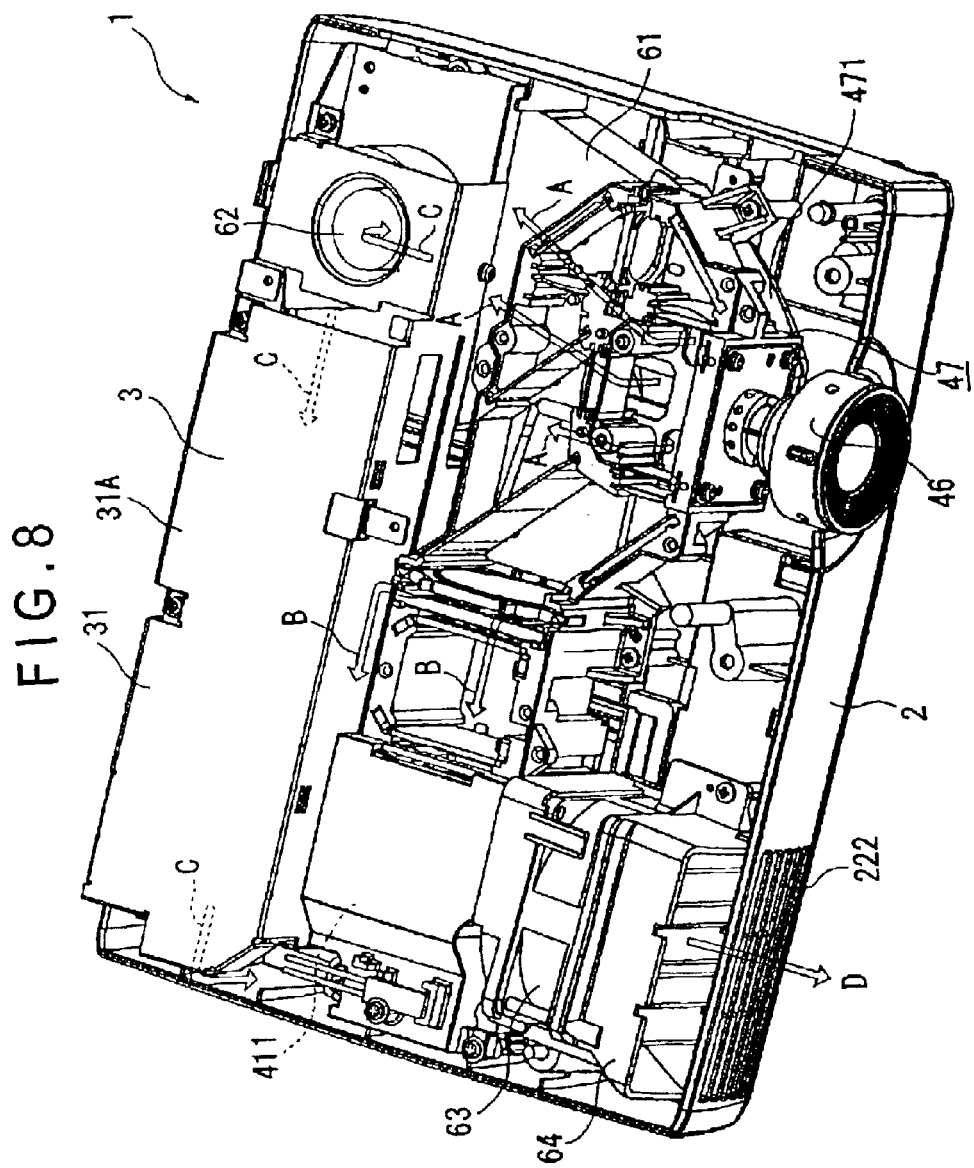
FIG. 8 is an illustration showing a flow of cooling air of panel cooling system A and power source cooling system C.
Figure 9:
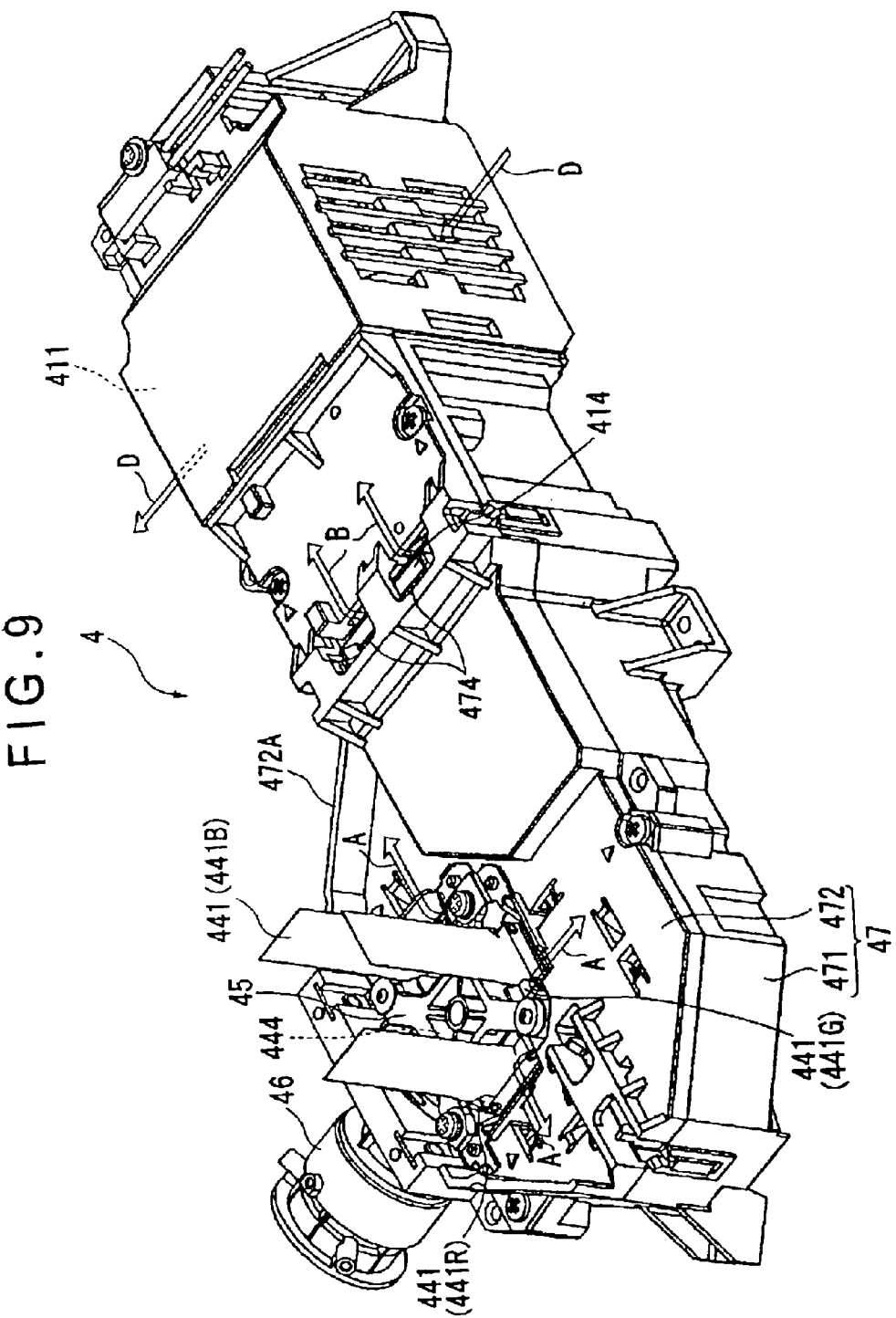
FIG. 9 is an illustration showing a flow of cooling air of the panel cooling system A and a polarizing conversion element cooling system B.

FIG. 8 is an illustration removing the upper inner case and the optical device body 45 from FIG. 4. FIG. 9 is a perspective view showing the optical unit 4.

As shown in FIGS. 8 and 9, the projector 1 has a panel cooling system A mainly for cooling the liquid crystal panel 441, a polarizing conversion element cooling system B mainly for cooling the polarization converter 414, a power source cooling system C mainly for cooling the power source unit 3, and a light source cooling system D mainly for cooling the light source 411.

As shown in FIG. 8, a large sirocco fan 61 disposed on the lower side of the power source unit 3 is used in the panel cooling system A.

In the panel cooling system A, as shown in FIGS. 8 and 9, the outside cooling air introduced from the intake (FIG. 2) formed on the lower side 250 of the exterior case 2 is guided to the lower side of the optical device body 45 by the sirocco fan 61 through a non-illustrated duct, which enters into the inner case 47 from the intake formed on the lower side of the respective liquid crystal panels 441 of the lower inner case 471. As shown in FIG. 9, the cooling air passes through the gap between the respective liquid crystal panels 441R, 441G and 441B and the cross dichroic prism 444 to cool the liquid crystal panel 441 and the irradiation-side polarization plate to be discharged to the space between the upper inner case 472 and the control board. Further, the cooling air passes through the gap between the respective liquid crystal panels 441R, 441G and 441B and the field lens 418 to cool the liquid crystal panel 441 and the incident-side polarization to be discharged to the space between the upper inner case 472 and the incident-side polarization plate.

Incidentally, the air discharged to the spaces is prevented from flowing toward the projection lens 46 by the contact of the upper end 472A of the upper inner case 472 and the control board 5.

The cooling air drawn in by the sirocco fan 61 is introduced to the lower side of the polarization converter 414 by a non-illustrated duct disposed on the lower side of the lower inner case 471, which enters into the inner case 47 from the intake formed on the lower side of the polarization converter 414 of the lower inner case 471 to cool the polarization converter 414 to be discharged from an exhaust hole 474 formed on the upper inner case 472.

A small sirocco fan 62 disposed on the upper side of the sirocco fan 61 sandwiching a metal plate is used in the power source cooling system C as shown in FIG. 8.

In the power source cooling system C, the cooling air flowing into the space between the upper inner case 472 and the control board 5 by the panel cooling system A is drawn in by the sirocco fan 62 while cooling the control board 5 to be discharged into the power source unit 3. The air discharged into the power source unit 3 flows along the shield 31A to cool the power source 31 and the lamp driving circuit to be discharged from an opening opposite to the sirocco fan 62.

The light source cooling system D uses an axial-flow fan 63 disposed on the front side of the light source 411 and a duct 64 attached to the axial-flow fan 63.

In the light source cooling system D, the air discharged by the power source cooling system C and the polarizing conversion element cooling system B enters into the light source 411 from the slit-shaped opening formed on the lateral side of the light source 411 being drawn by the axial-flow fan 63 to cool the light source lamp 416 and is discharged from the exhaust hole 222 of the exterior case 2 toward the outside through the duct 64.

4. Structure of Polarization Converter

Figure 10:
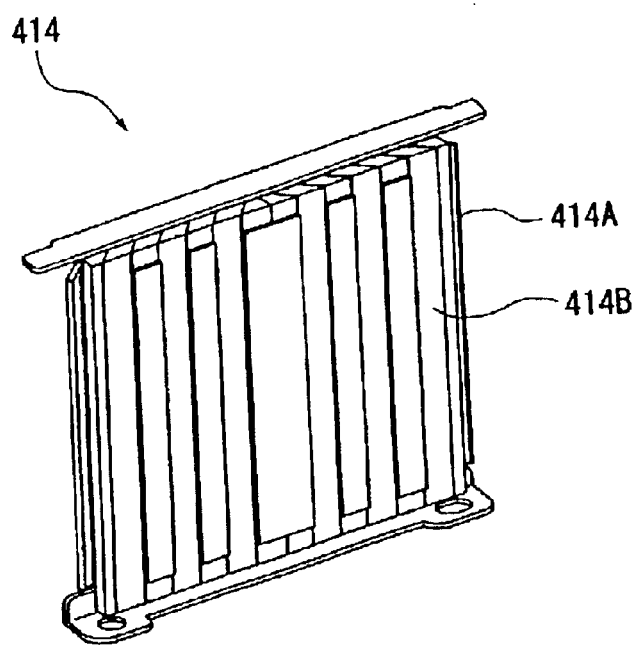
FIG. 10 is a perspective view showing a polarization converter according to an aspect of the present invention.
Figure 11:
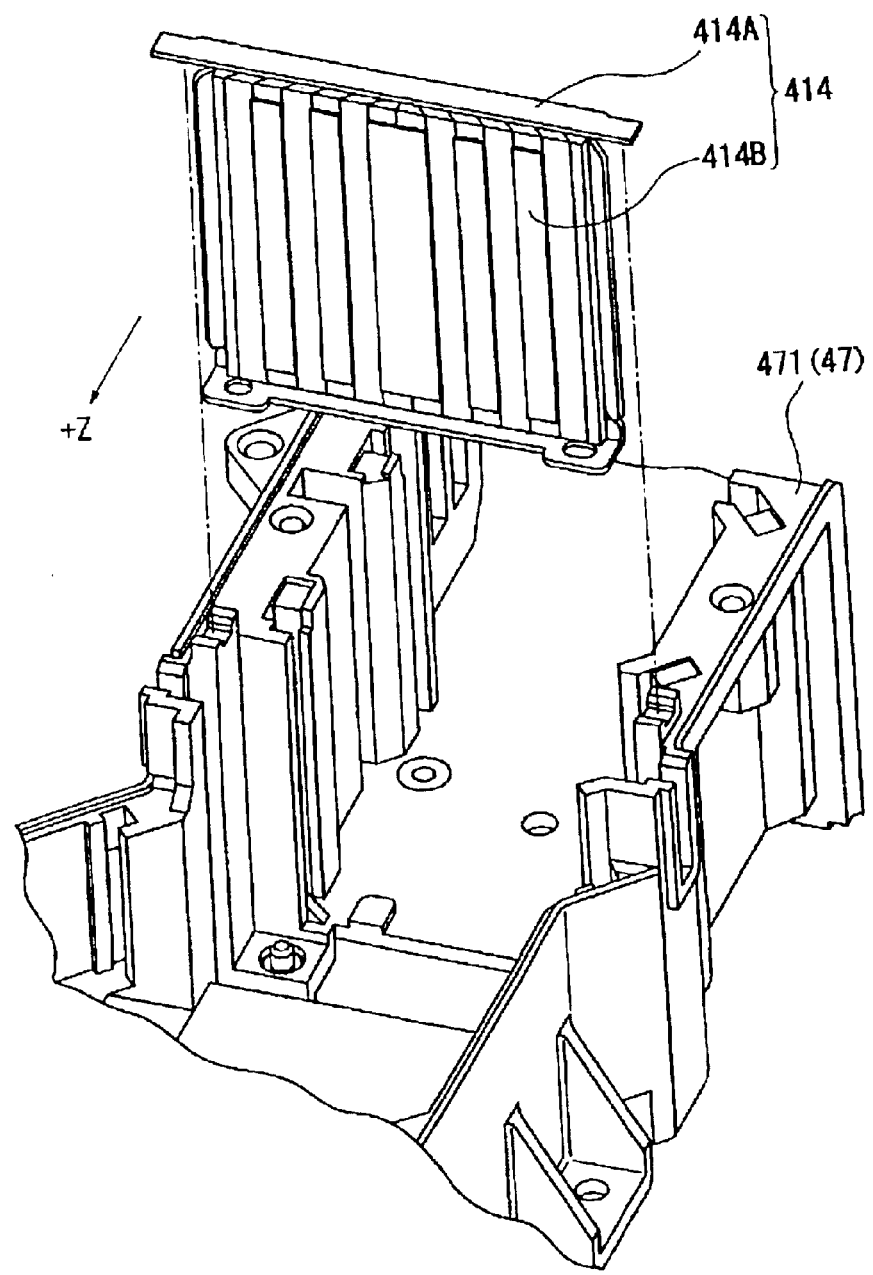
FIG. 11 is an illustration showing the polarization converter being housed in an inner case.
Figure 12:
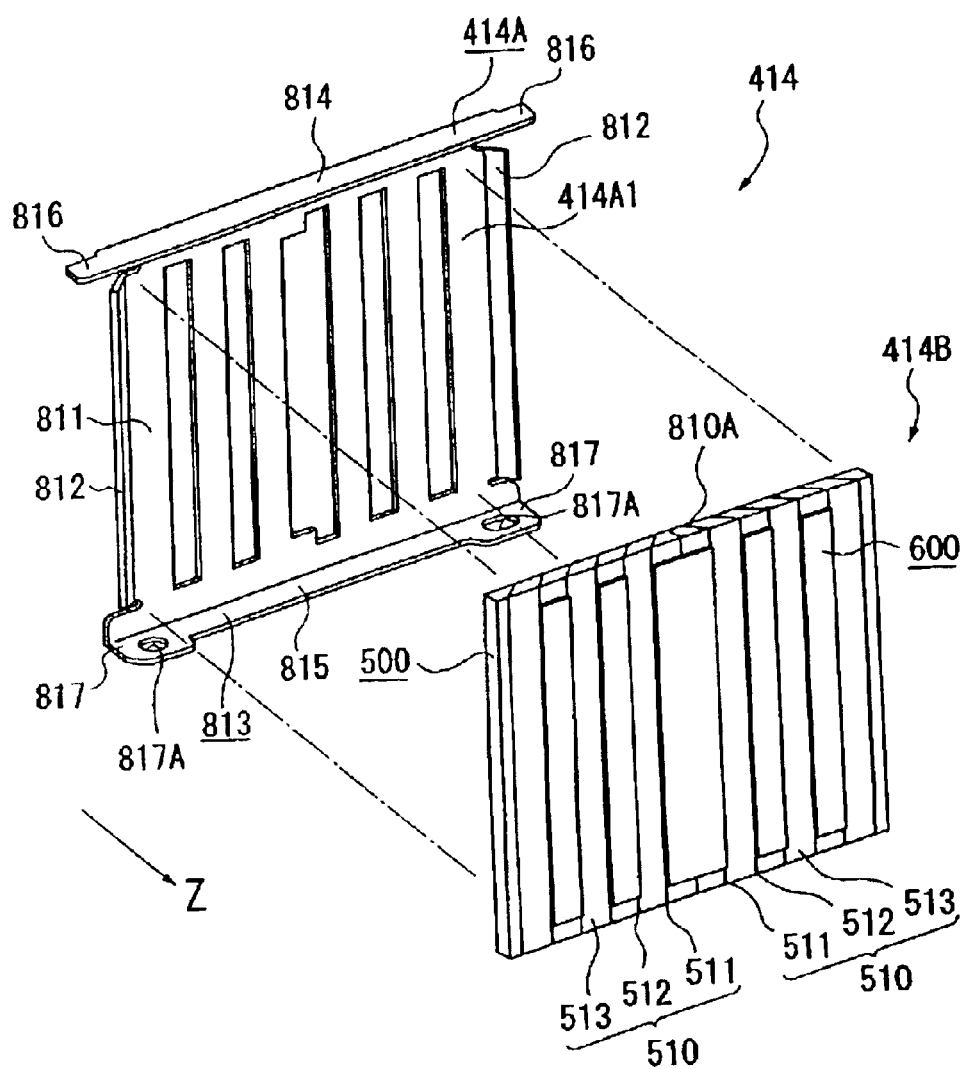
FIG. 12 is an exploded perspective view showing the polarization converter.

FIG. 10 is a perspective view showing the polarization converter. FIG. 11 is an illustration showing the polarization converter to be housed in the inner case. FIG. 12 is an exploded perspective view showing the polarization converter.

As described above, the polarization converter 414 converts the light beam condensed by the lenses of the second lens array 413 into approximately uniform polarization light in transmitting the light. As shown in FIG. 10, the polarization converter 414 has a flat polarizing conversion element body 414B and a fixing frame 414A as a frame-shaped light-shielding member on which the polarizing conversion element body 414B to be adhered and fixed. The polarizing conversion element body 414B and the fixing frame 414A are adhered and fixed by an adhesive.

As shown in FIG. 11, the polarization converter 414 is housed in a lower inner case 471 of the inner case 47. At this time, the fixing frame 414A is disposed on the side of the light source lamp, i.e. on the light-incident side, and the polarizing conversion element body 414B is disposed on the light-irradiation side.

As shown in FIG. 12, the polarizing conversion element body 414B has a flat polarizing conversion element array 500 and a retardation plate 600 located on the light-irradiation side of the polarizing conversion element array 500. The polarizing conversion element body 414B separates the light beam into two linearly polarization beams by the polarizing conversion element array 500 and turns by ninety degrees the polarization axis of one of the two linearly polarization beams by the retardation plate 600 to be aligned with the polarization axis of the other linearly polarization beam.

The polarizing conversion element array 500 irradiates the incident light beam after separating into two linearly polarization beams, which is composed of two polarizing conversion elements 510 mutually abutted and fixed at thickness portion thereof to be a single plate as shown in FIG. 12.

The polarizing conversion element 510 has a plurality of polarization separating films 511 inclined relative to the incident light beam, a reflecting film disposed in parallel between the polarization separating films 511, and a sheet glass 513 as a light-transmissive member interposed between the polarization separating film 511 and the reflecting film 512.

The polarization separating film 511 is constructed of dielectric multi-layer film etc. with Brewster's angle of approximately forty-five degrees. The polarization separating film 511 reflects a light beam (S polarization light) having a polarization axis parallel to the incident surface of the polarization separating film 511 of the incident light beam and transmits the light beam (P polarization light) having a polarization axis orthogonal with the S polarization light, which separates the incident light beam into two linearly polarization beams.

The reflecting film 512 is made by a single metal having high reflectivity such as aluminum, gold, silver, copper and chromium or an alloy thereof, which reflects the S polarization light reflected by the polarization separating film 511.

The sheet glass 513 transmits the light beam therethrough, which is made of white sheet glass etc.

Figure 13:
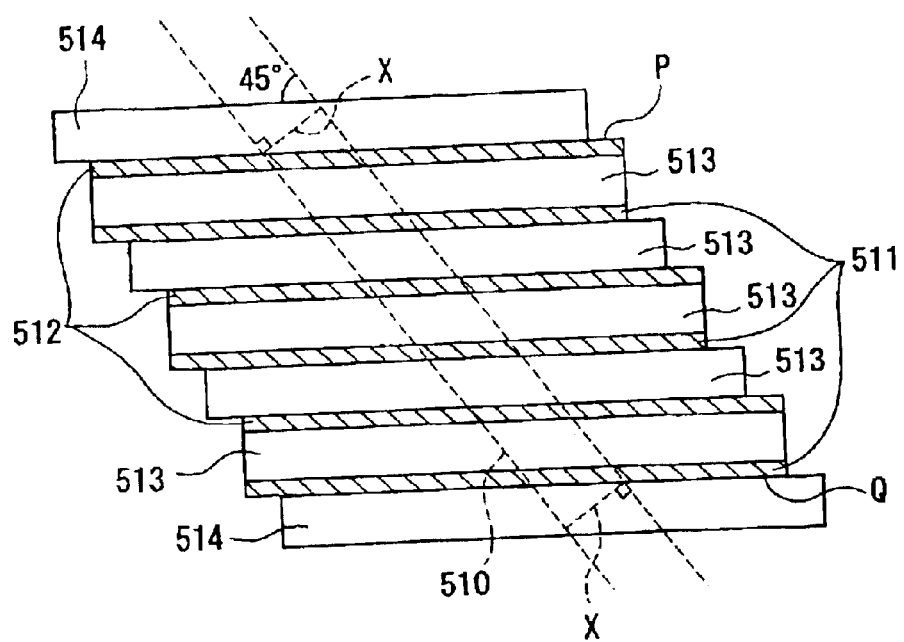
FIG. 13 is a schematic illustration seen from thickness direction showing construction of the polarizing conversion element array.

FIG. 13 is an illustration showing construction of the polarizing conversion element array, which is a schematic illustration seen from thickness direction.

The polarizing conversion element 510 is produced, as follows for instance, so that the polarization separating film 511 and the reflecting film 512 are arranged at forty-five degrees relative to the front and back sides thereof in an alternate manner.

Initially, as shown in FIG. 13, the sheet glass 513 provided with the polarization separating film 511 and the reflecting film 512 on both sides thereof and another sheet glass 513 having no films thereon are alternately bonded by an adhesive. At this time, a sheet glass 514 having no polarization separating film and reflecting film is disposed on top and bottom surfaces P, Q of the bonded sheet glasses 513.

Subsequently, the bonded sheet glasses is cut approximately in parallel with a predetermined interval at approximately forty-five degrees relative to the top and bottom sides thereof as shown in dotted line of FIG. 13. Next, the portion projected on both ends is cut at a cutting surface X to form an approximately rectangular parallelepiped plate. Finally, the entire surface including the cut surface X is polished to make the polarizing conversion element 510.

Accordingly, the polarization separating film 511 and the reflecting film 512 of the polarizing conversion element 510 are inclined approximately at forty-five degrees relative to the light-incident side and the light-irradiation side and are arranged at an even pitch.

Figure 14:
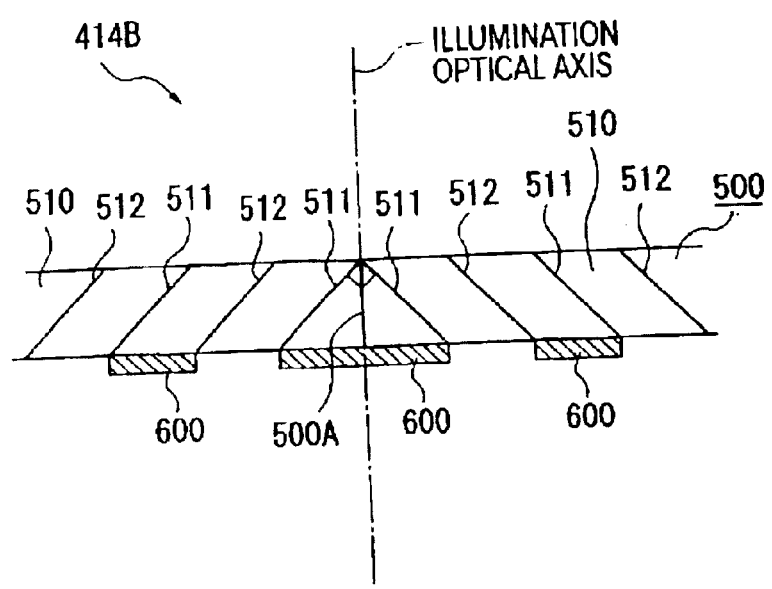
FIG. 14 is a partial schematic illustration showing the polarizing conversion element body from the upper side.

FIG. 14 is a partial schematic illustration showing the polarizing conversion element body 414B from the upper side.

The retardation plate 600 turns the polarization axis of the P polarization light transmitting through the polarization separating film 511 by ninety degrees. As shown in FIG. 14, the retardation plate 600 is adhered on the light-irradiation side of the polarizing conversion element 510 corresponding to the polarization separating film 511 seen in a direction along the illumination optical axis. At this time, the retardation plate 600 disposed on the illumination optical axis is adhered stretching over the two polarizing conversion elements 510.

As shown in FIG. 14, the polarization separating film 511 of the respective polarizing conversion element 510 has approximately reverse V-shaped cross section. Adjoining polarization separating films 511 consecutively extends at approximately ninety degrees on a contact surface 500A at which the respective polarizing conversion elements 510 contact closely with each other. Accordingly, the light beam of strong luminance on the optical axis of the illumination irradiated by the light source lamp 416 is irradiated on the polarization separating film 511 connected at approximately ninety degrees.

As shown in FIG. 12, the fixing frame 414A is a frame member made of metal such as aluminum, which is shaped in an approximately rectangular form for holding a light-incident side 810A of the polarizing conversion element body 414B.

As shown in FIG. 12, the fixing frame 414A has an contact surface 811 for the light incident side 810A of the polarizing conversion element body 414B to be abutted, a lateral holding surface 812 bent at right and left peripheries of the contact surface 811 to a light irradiation side (in +Z direction) at approximately forty-five degrees to prevent lateral shift of the polarizing conversion element body 414B, and a vertical holding surface 813 bent from upper and lower peripheries of the contact surface 811 to the light-irradiation side (in +Z direction) of the abutting surface. The contact surface 811, the lateral holding surface 812 and the vertical holding surface 813 work as a holder.

Figure 15:
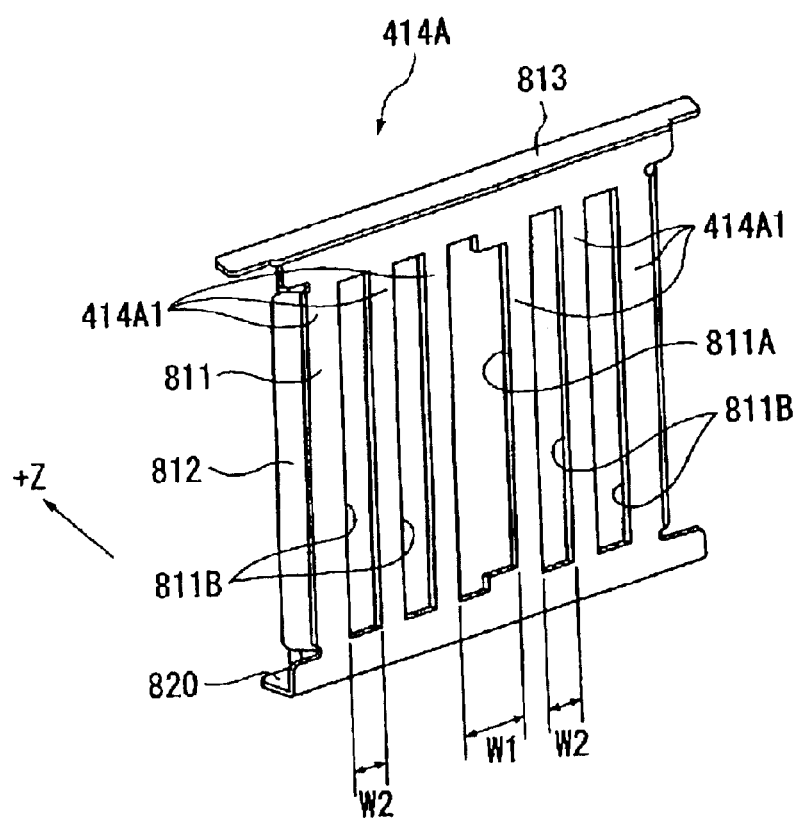
FIG. 15 is a perspective view showing the fixing frame from light-incident side.

FIG. 15 is a perspective view showing the fixing frame from the light-incident side.

The contact surface 811 is a rectangular plate portion having approximately the same dimension as the outer profile of the polarizing conversion element body 414B. As shown in FIG. 15, a vertically stretching rectangular opening 811A is formed approximately at the center of the contact surface 811 and two rectangular openings 811B are formed on both sides of the opening 811A at a regular interval.

As shown in FIG. 15, width W1 of the opening 811A is approximately twice as width W2 of the opening 811B, where a part of opposing upper and lower corners is not opened, the opening 811A being shaped in fat and stretched 'p' shape seen from front side.

The opening 811A exposes the polarization separating film 511 located approximately at the center of the polarizing conversion element body 414B and connected at ninety degrees on the light-incident side (−Z direction). The opening 811B exposes the other polarization separating film 511 on the light-incident side (−Z direction).

In other words, as shown in FIGS. 12 and 15, a light-shielding member 414A1 for shielding the reflecting film 512 seen from the light incident side in a direction along the illumination optical axis to shield the incident light beam from the light source lamp is formed.

As shown in FIG. 12, the vertical holding surface 813 fixes the polarization converter 414 at a predetermined position on the lower inner case 471 and prevents vertical position shift of the polarizing conversion element body 414B. The vertical holding surface 813 has an upper holding surface 814 formed on the upper end of the contact surface 811 and a lower holding surface 815 formed on the lower end of the contact surface 811.

The upper holding surface 814 restricts upward position shift of the polarizing conversion element body 414B. The upper holding surface 814 has an extension 816 stretching toward outside along the contact surface 811 on both sides.

The lower holding surface 815 supports the polarizing conversion element body 414B from the lower side. Extensions 817 stretching from both sides toward outside and light-incident side along the contact surface 811 are formed on the lower holding surface 815. The extensions 817 have respectively one circular opening 817A.

Figure 16:
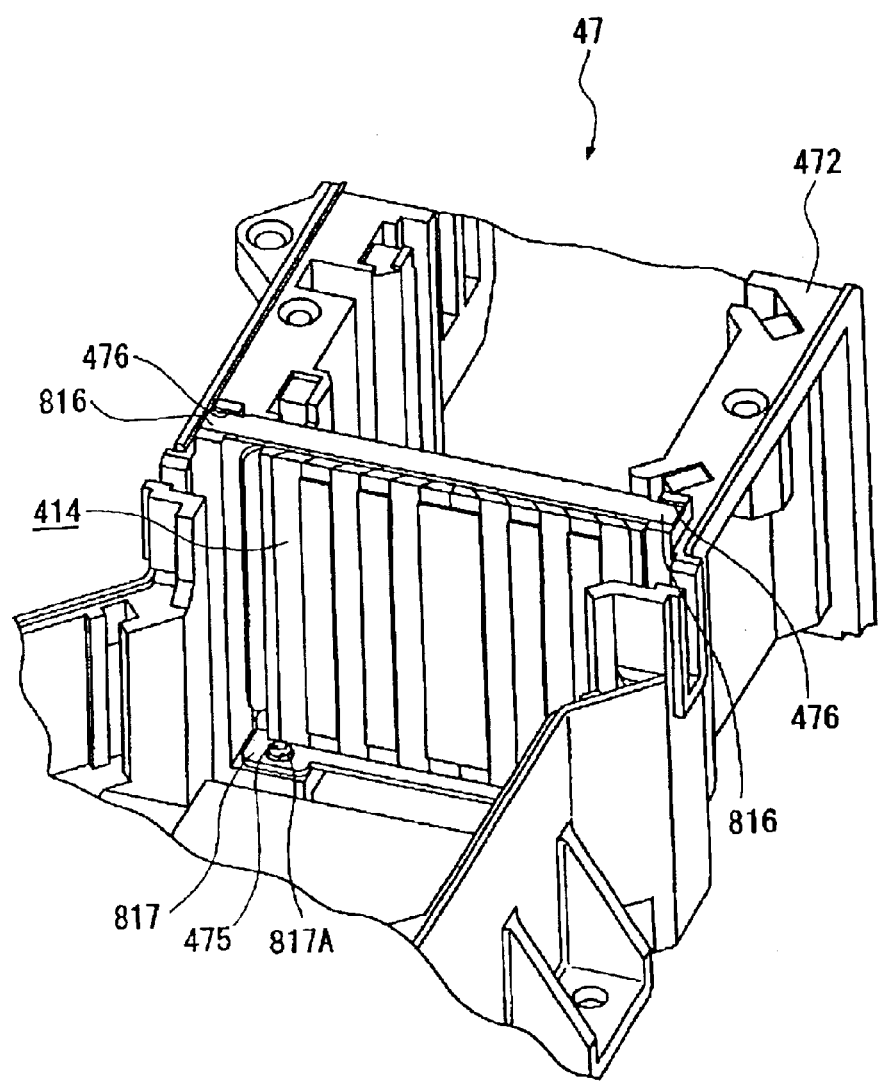
FIG. 16 is a perspective view showing the polarization converter being housed in the inner case.

FIG. 16 is a perspective view showing the polarization converter 414 housed in the lower inner case 471. As shown in FIG. 16, two projections 475 on the fight and left sides projecting upward and a groove 476 for the extension 816 as a part of the polarization converter 414 to be fitted is formed inside the lower inner case 471 at a position for the polarization converter 414 to be housed (partially hidden in the drawing).

The circular opening 817A of the extension 817 is inserted to the two projections 475 when the polarization converter 414 is housed in the lower inner case 471. Accordingly, the displacement of the lower end of the polarization converter 414 is restricted.

The groove 476 supports the fitted extension 816 from the lower side so that the displacement of the upper end of the polarization converter 414 is restricted.

Accordingly, the fixing frame 414A works as a fixing portion to be fixed to the lower inner case 471 by the circular opening 817A to be inserted to the two projections 475 and the extension 816 fitted to the groove 476.

Figure 17:
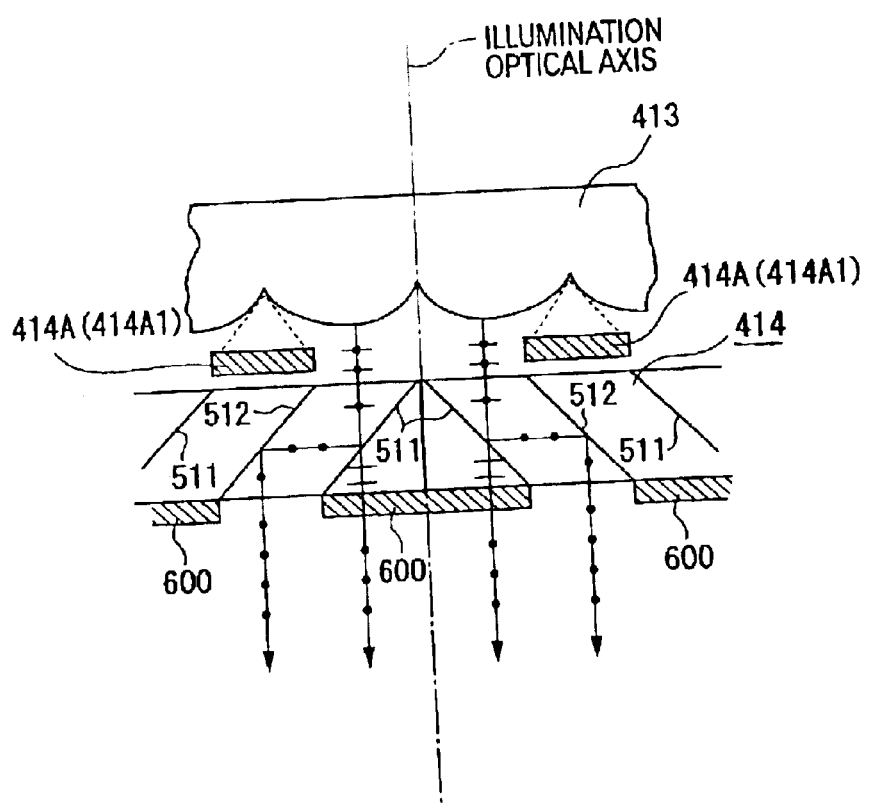
FIG. 17 is a schematic illustration showing a function of the polarization converter.

FIG. 17 is a schematic illustration for explaining the function of the polarization converter 414.

The light beam incident on the second lens array 413 is a light beam having random polarization axis condensed by the lenses, which enters on a predetermined area of the polarization converter 414. Incidentally, as described above, the light-shielding member 414A1 is formed on the fixing fame 414A, which shields the light beam irradiated by the second lens array 413 which generates ineffective light beam, as shown in dotted line in FIG. 17.

The light beam incident on the polarization converter 414 is separated into P polarization light and S polarization light by the polarization separating film 511. In other words, the P polarization light transmits through die polarization separating film 511 and the S polarization light is reflected by the polarization separating film 511 so that optical axis thereof is turned by approximately ninety degrees.

The S polarization light reflected by the polarization separating film 511 is reflected by the reflecting film 512 and the optical path thereof is again turned by ninety degrees to advance in approximately the same direction as the incident direction toward the polarization converter 414. The P polarization light transmitted through the polarization separating film 511 enters on the retardation plate 600, where the polarization axis thereof is turned by ninety degrees to be converted into and irradiated as S polarization light. Accordingly, the light beam irradiated by the polarization converter 414 becomes approximately uniform S polarization light.

5. Advantage of Embodiment

According to the present embodiment, following advantages can be obtained.

(1) Since the polarizing conversion element body 414B is held by the contact surface 811, the lateral holding surface 812 and the vertical holding surface 813 of the fixing frame 414A through an adhesive and the held component is housed in the lower inner case 471, the number of the components of the polarization converter 414 can be reduced to two from conventional three components, thus reducing production cost. Further, since the number of the components is reduced to two and only direct position adjustment between the two components is necessary, the position of the light-shielding member 414A1 relative to the polarizing conversion element body 414B can be adjusted with high accuracy. Accordingly, unnecessary light incident on the polarizing conversion element body 414B can be more effectively shielded, thus improving utilization efficiency of the light beam from the light source. Accordingly, vivid image with high luminance can be projected by the projector 1.

(2) The polarization converter 414 can be fixed to the lower inner case 471 with a simple arrangement where the projection 475 formed on the lower inner case 471 is inserted to the circular hole 817A formed on the extension. Accordingly, the production cost of the polarization converter 414 can be restrained by the simple structure.

(3) Since the fixing frame 414A is made of metal, enough rigidity as a component holding the polarizing conversion element body 414B can be secured. Since the fixing frame 414A is made of metal having high thermal conductivity such as aluminum, the heat generated by the polarizing conversion element body 414B can be radiated toward outside, thereby preventing heat damage on the polarizing conversion element body 414B which is weak against heat.

(4) Since the polarization separating film 511 and the reflecting film 512 of the polarizing conversion element 510 is inclined approximately at forty-five degrees relative to light-incident direction, the polarizing conversion element 510 can be produced under optimum condition without unnecessarily enlarging the ineffective area for generating linearly polarization beam by polarization light) having polarization axis different from necessary linearly polarization beam (S polarization light).

(5) Since the integrator illuminating optical system 41 has the above polarization converter 414, the integrator illuminating optical system 41 can irradiate the light beam irradiated by the light source 411 after converting into approximately uniform linearly polarization beam (S polarization light), thereby effectively utilizing the light beam.

(6) As described above, since the light beam is effectively used, the unnecessary light is less likely to be absorbed by the incident-side polarization plate 442 disposed on the incident-side4 of the liquid crystal panel 441, thereby preventing heat damage of the incident-side polarization plate 442 caused by absorbing the unnecessary light 6. Modifications Incidentally, the scope of the present invention is not restricted to the above embodiments, but includes other arrangements as long as an object of the present invention can be achieved, which includes following modifications.

For instance, though the two projections 475 of the lower inner case 471 awe inserted to the two circular openings 817A to fix the polarization converter 414 in the above embodiment, the number of the circular openings 817A and the projections 475 is not restricted to two, but may be arranged in any number as long as the polarization converter 414 can be fixed. Further, the profile of the opening may not be circular, but may be designed in any manner such as rectangular shape.

Though the fixing flame 414A is made of metal material such as aluminum, the fixing frame 414A may be made of other material such as resin. In other words, any material may be used as long as enough rigidity can be secured for holding the polarizing conversion element body 414B.

Though the polarizing conversion element 510 is constructed by alternately bonding the sheet glass 513 having the polarization separating film 511 and the reflecting film 512 on both sides thereof and the sheet glass 513 having no films thereon and cutting and polishing the sheet glasses after attaching the sheet glass 514 on the top and bottom sides thereof, the arrangement is not limiting. In other words, any construction is possible as long as the polarization separating film 511 and the reflecting film 512 can be alternately arranged. At this time, the angle of the polarization separating film 511 and the reflecting film 512 relative to the incident angle may not be forty-five degrees.

Though a projector having three optical modulators is taken as an example in the above embodiment, the present invention may be applied to a projector having only one optical modulator, a projector having two optical modulators, or a projector having more than three optical modulators.

Though the liquid crystal panel is used as the optical modulator, an optical modulator such as a device using a micro-mirror may be used.

Though the transmissive optical modulator having different light-incident side and the light-irradiation side is used in the above embodiment, a reflective optical modulator having common light-incident and light-irradiation side may be used.

Though a front-type projector for projecting the image in a direction for observing a screen is taken as an example, the present invention may be applied to a rear-type projector here the image is projected on a side opposite to a side for observing a screen

What is claimed is:

1. A polarization converter, comprising:

a polarizing conversion element body, including;

a plurality of polarization separating films which are inclined relative to an incident light beam and which separate the incident light beam into two linearly polarized beams, a plurality of reflecting films that reflect one of the linearly polarized beams separated by the polarization separating films, a plurality of light-transmissive members provided with the polarization separating films and the reflecting films, and a plurality of retardation plates provided on a light-irradiation side of the light-transmissive member to convert the polarization axis of the other linearly polarization beam; and a light-shielding member provided on a light-incident side of the light-transmissive members at a position not opposite to the retardation plates, wherein the light-shielding member shields a part of the incident light beam irradiated by the light source from entering the polarizing conversion element body, and the light-shielding member has a holder that holds an end of the polarizing conversion element body and a fixing portion for the polarization converter to be attached on an optical parts housing that houses the polarization converter.

2. The polarization converter according to claim 1, wherein the fixing portion is an extension stretching from both peripheral ends of the holder contacting the optical parts housing toward outside along a holding surface of the holder, the extension having an insert opening to be inserted to a projection formed on the optical parts housing.

3. The polarization converter according to claim 1, wherein the light-shielding member is made of metal.

4. The polarization converter according to claim 1, wherein the polarization separating film and the reflecting film are inclined approximately at forty-five degrees relative to a light-incident direction, the polarization separating film and the reflecting film are alternately arranged at predetermined intervals.

5. An illumination optical device, comprising:

a light source;

a light splitting optical element that splits a light beam from the light source into a plurality of sub-beams; and a polarization converter including:

a polarizing conversion element body including:

a plurality of polarization separating films, which are inclined relative to an incident light beam and which separate the incident light beam into two linearly polarized beams, a plurality of reflecting films that reflect one of the linearly polarized beams separated by the polarization separating films, a plurality of light-transmissive members provided with the polarization separating films and the reflecting films, and a plurality of retardation plates provided on a light-irradiation side of the light-transmissive members to convert the polarization axis of the other linearly polarized beam; and a light-shielding member provided on a light-incident side of the light-transmissive members at a position not opposite to the retardation plates, wherein the light-shielding member shields a part of the incident light beam irradiated by the light source from entering the polarizing conversion element body, and the light-shielding member has a holder that holds an end of the polarizing conversion element body and a fixing portion for the polarization converter to be attached on an optical parts housing that houses the polarization converter.

6. A projector, comprising:

an illumination optical device, including:

a light source;

a light beam splitting optical element that splits a light beam from the light source into a plurality of sub-beams; and a polarization converter including:

a polarizing conversion element body including:

a plurality of polarization separating films, which are inclined relative to an incident light beam and which separate the incident light beam into two linearly polarized beams, a plurality of reflecting films that reflect one of the linearly polarized beams separated by the polarization separating film, a plurality of light-transmissive members provided with the polarization separating films and the reflecting films, and a plurality of retardation plates provided on a light-irradiation side of the light-transmissive member to convert the polarization axis of the other linearly polarized beam; and a light-shielding member provided on a light-incident side of the light-transmissive members at a position not opposite to the retardation plates, wherein the light-shielding member shields a part of the incident light beam irradiated by the light source from entering the polarizing conversion element body, and wherein the light-shielding member has a holder that holds an end of the polarizing conversion element body and a fixing portion for the polarization converter to be attached on an optical parts housing that houses the polarization converter;

an optical modulator that modulates the light beam irradiated by the illuminating optical device in accordance with image information; and a projection optical device that enlarges and projects the light beam modulated by the optical modulator.

7. The illumination optical device according to claim 5, wherein the fixing portion is an extension stretching from both peripheral ends of the holder contacting the optical parts housing toward outside along a holding surface of the holder, the extension having an insert opening to be inserted to a projection formed on the optical parts housing.

8. The illumination optical device according to claim 5, wherein the light-shielding member is made of metal.

9. The illumination optical device according to claim 5, wherein the polarization separating film and the reflecting film are inclined approximately at forty-five degrees relative to a light-incident direction, the polarization separating film and the reflecting film are alternately arranged at predetermined intervals.

10. The projector according to claim 6, wherein the fixing portion is an extension stretching from both peripheral ends of the holder contacting the optical parts housing toward outside along a holding surface of the holder, the extension having an insert opening to be inserted to a projection formed on the optical parts housing.

11. The projector according to claim 6, wherein the light-shielding member is made of metal.

12. The projector according to claim 6, wherein the polarization separating film and the reflecting film are inclined approximately at forty-five degrees relative to a light-incident direction, the polarization separating film and the reflecting film are alternately arranged at predetermined intervals.

* * * * *